United States Patent
Kwong et al.

(10) Patent No.: US 9,154,678 B2
(45) Date of Patent: Oct. 6, 2015

(54) COVER GLASS ARRANGEMENT FOR AN ELECTRONIC DEVICE

(71) Applicant: Apple Inc., Cupertino, CA (US)

(72) Inventors: Kelvin Kwong, San Jose, CA (US); Lee E. Hooton, Cupertino, CA (US); David G. Havskjold, Portola Valley, CA (US); Anthony S. Montevirgen, San Francisco, CA (US); Emery A. Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/103,661

(22) Filed: Dec. 11, 2013

(65) Prior Publication Data
US 2015/0163382 A1 Jun. 11, 2015

(51) Int. Cl.
*H04N 5/225* (2006.01)

(52) U.S. Cl.
CPC .................. *H04N 5/2254* (2013.01)

(58) Field of Classification Search
CPC .................................... H04N 5/2254
USPC .......................... 348/335, 374, 375
See application file for complete search history.

(56) References Cited

U.S. PATENT DOCUMENTS

| | | | |
|---|---|---|---|
| 2,248,955 A | 7/1941 | Capps | |
| 2,854,794 A | 10/1958 | Luedeman | |
| 3,753,775 A | 8/1973 | Robinson et al. | |
| 3,964,942 A | 6/1976 | Berkenblit et al. | |
| 4,008,111 A | 2/1977 | Rutz | |
| 4,054,895 A | 10/1977 | Ham | |
| 4,070,211 A | 1/1978 | Harari | |
| 4,085,302 A | 4/1978 | Zenk et al. | |
| 4,339,300 A | 7/1982 | Noble | |
| 4,393,578 A | 7/1983 | Cady et al. | |
| 4,662,124 A | 5/1987 | Kato et al. | |
| 4,732,867 A | 3/1988 | Schnable | |
| 4,735,917 A | 4/1988 | Flatley et al. | |
| 4,775,641 A | 10/1988 | Duffy et al. | |
| 4,811,004 A | 3/1989 | Person et al. | |
| 4,826,300 A | 5/1989 | Efron et al. | |
| 4,849,299 A | 7/1989 | Loth | |
| 4,908,074 A | 3/1990 | Hosoi et al. | |

(Continued)

FOREIGN PATENT DOCUMENTS

DE 202008002512 U1 6/2008
EP 0305626 3/1989

(Continued)

OTHER PUBLICATIONS

Schmid et al., "Effect of Crystal Orientation and Temperature on the Strength of Sapphire," J.Am.Ceram.Soc., 81, 1998, pp. 885-893.

(Continued)

*Primary Examiner* — Gevell Selby
(74) *Attorney, Agent, or Firm* — Brownstein Hyatt Farber Schreck, LLP

(57) ABSTRACT

An electronic device can include a camera and a cover glass arrangement disposed over the camera. The cover glass arrangement includes a thinner region or cover glass that is positioned over a light-receiving region of the camera. Additionally, the thinner region or cover glass can be disposed over the light-receiving region and at least parts of one or more non-light receiving regions of the camera.

17 Claims, 4 Drawing Sheets

(56) References Cited

U.S. PATENT DOCUMENTS

| | | |
|---|---|---|
| 4,946,546 A | 8/1990 | Bourgeois |
| 5,151,389 A | 9/1992 | Zappella |
| 5,154,023 A | 10/1992 | Sioshansi |
| 5,377,669 A | 1/1995 | Schulz |
| 5,413,360 A | 5/1995 | Atari et al. |
| 5,427,051 A | 6/1995 | Maxwell et al. |
| 5,441,591 A | 8/1995 | Imthurn et al. |
| 5,451,553 A | 9/1995 | Scott et al. |
| 5,543,630 A | 8/1996 | Bliss et al. |
| 5,549,746 A | 8/1996 | Scott et al. |
| 5,627,109 A | 5/1997 | Sassa et al. |
| 5,661,313 A | 8/1997 | Dubbelday et al. |
| 5,697,998 A | 12/1997 | Platus et al. |
| 5,702,654 A | 12/1997 | Chen et al. |
| 5,804,522 A | 9/1998 | Uegami |
| 5,852,622 A | 12/1998 | Meissner et al. |
| 5,877,094 A | 3/1999 | Egley et al. |
| 6,025,060 A | 2/2000 | Meissner et al. |
| 6,028,711 A * | 2/2000 | Adachi .................. 359/642 |
| 6,028,762 A | 2/2000 | Kamitani |
| 6,030,849 A | 2/2000 | Hasegawa et al. |
| 6,038,079 A | 3/2000 | Michaels |
| 6,123,026 A | 9/2000 | Gottlieb |
| 6,265,089 B1 | 7/2001 | Fatemi et al. |
| 6,379,985 B1 | 4/2002 | Cervantes et al. |
| 6,406,769 B1 | 6/2002 | Delabre |
| 6,424,017 B2 | 7/2002 | Kurtz et al. |
| 6,483,237 B2 | 11/2002 | Eastlund et al. |
| 6,489,221 B2 | 12/2002 | Gehrke et al. |
| 6,547,722 B1 * | 4/2003 | Higuma et al. ............. 600/133 |
| 6,586,819 B2 | 7/2003 | Matsuoka |
| 6,642,989 B2 | 11/2003 | Umehara et al. |
| 6,775,073 B2 | 8/2004 | Fukazawa |
| 6,818,532 B2 | 11/2004 | Moeggenborg et al. |
| 6,819,693 B2 | 11/2004 | Derriey et al. |
| 6,849,524 B2 | 2/2005 | Shelton et al. |
| 6,852,253 B2 | 2/2005 | Tomioka |
| 6,858,274 B2 | 2/2005 | Fukazawa |
| 6,872,108 B2 | 3/2005 | Hsu |
| 6,875,099 B2 | 4/2005 | Tatartchenko et al. |
| 6,911,375 B2 | 6/2005 | Mack, III et al. |
| 7,018,709 B2 | 3/2006 | Stevenson et al. |
| 7,030,417 B2 | 4/2006 | Bakshi et al. |
| 7,074,652 B2 | 7/2006 | Kumaran et al. |
| 7,128,846 B2 | 10/2006 | Gaudin et al. |
| 7,150,669 B2 | 12/2006 | Hasegawa et al. |
| 7,166,909 B2 | 1/2007 | Morinaga et al. |
| 7,198,505 B2 | 4/2007 | Cherian et al. |
| 7,255,740 B2 | 8/2007 | Sprenger et al. |
| 7,390,702 B2 | 6/2008 | Nakamura |
| 7,495,615 B2 | 2/2009 | Yamanaka et al. |
| 7,616,951 B2 | 11/2009 | Chang et al. |
| 7,619,567 B2 | 11/2009 | Lynch et al. |
| 7,663,189 B2 | 2/2010 | Fukuda |
| 7,683,838 B2 | 3/2010 | Koyama et al. |
| 7,704,321 B2 | 4/2010 | Riman et al. |
| 7,803,451 B2 | 9/2010 | Lee et al. |
| 7,807,549 B2 | 10/2010 | Tong et al. |
| 7,883,557 B2 | 2/2011 | Liu et al. |
| 7,902,474 B2 | 3/2011 | Mittleman et al. |
| 7,943,953 B2 | 5/2011 | Sakamoto et al. |
| 7,956,356 B2 | 6/2011 | Tanikella et al. |
| 7,966,785 B2 | 6/2011 | Zadesky et al. |
| 7,977,587 B2 | 7/2011 | Rajagopal et al. |
| 8,003,189 B2 | 8/2011 | Jones et al. |
| 8,157,912 B2 | 4/2012 | Wei |
| 8,158,900 B2 | 4/2012 | Maatta |
| 8,197,303 B2 | 6/2012 | Tanikella et al. |
| 8,268,656 B2 | 9/2012 | Kajiyama |
| 8,390,023 B2 | 3/2013 | Armitage et al. |
| 8,455,879 B2 | 6/2013 | Tanikella et al. |
| 8,721,917 B2 | 5/2014 | Cherian et al. |
| 2002/0017653 A1 | 2/2002 | Chuang |
| 2002/0167068 A1 | 11/2002 | Hsu et al. |
| 2002/0168837 A1 | 11/2002 | Hsu et al. |
| 2004/0105026 A1 * | 6/2004 | Campbell .................. 348/340 |
| 2006/0003587 A1 | 1/2006 | Hsu et al. |
| 2006/0043396 A1 | 3/2006 | Tsuda et al. |
| 2006/0162849 A1 | 7/2006 | Han |
| 2006/0196849 A1 | 9/2006 | Moeggenborg et al. |
| 2007/0204493 A1 | 9/2007 | Foley et al. |
| 2008/0055748 A1 * | 3/2008 | Konno .................. 359/819 |
| 2008/0075941 A1 | 3/2008 | Tatartchenko et al. |
| 2008/0145632 A1 | 6/2008 | Nagami |
| 2008/0264767 A1 | 10/2008 | Chen et al. |
| 2009/0098807 A1 | 4/2009 | Bakshi et al. |
| 2009/0104409 A1 | 4/2009 | Derriey et al. |
| 2009/0130415 A1 | 5/2009 | Mack, III et al. |
| 2009/0268019 A1 * | 10/2009 | Ishii et al. .................. 348/294 |
| 2009/0321234 A1 | 12/2009 | Yu et al. |
| 2010/0092728 A1 | 4/2010 | Hasegawa et al. |
| 2011/0019123 A1 | 1/2011 | Prest et al. |
| 2011/0019354 A1 | 1/2011 | Prest et al. |
| 2011/0062394 A1 | 3/2011 | Kumaran et al. |
| 2011/0177300 A1 | 7/2011 | Hankey et al. |
| 2011/0195560 A1 | 8/2011 | Gaudin et al. |
| 2011/0223840 A1 | 9/2011 | Morinaga et al. |
| 2012/0038471 A1 | 2/2012 | Kim et al. |
| 2012/0088099 A1 | 4/2012 | Tosatti et al. |
| 2012/0118228 A1 | 5/2012 | Lee et al. |
| 2012/0135177 A1 | 5/2012 | Cornejo et al. |
| 2012/0212890 A1 | 8/2012 | Hoshino et al. |
| 2012/0229424 A1 | 9/2012 | Behles et al. |
| 2013/0102359 A1 * | 4/2013 | Ho .................. 455/556.1 |
| 2013/0237402 A1 | 9/2013 | Wang et al. |

FOREIGN PATENT DOCUMENTS

| | | |
|---|---|---|
| EP | 1013802 | 6/2000 |
| EP | 1829846 | 9/2007 |
| GB | 1135886 | 12/1968 |
| JP | 54032062 | 3/1979 |
| JP | 1173764 | 7/1989 |
| JP | 2039578 | 2/1990 |
| JP | 3021048 | 1/1991 |
| JP | 03115200 | 5/1991 |
| JP | 3177335 | 8/1991 |
| JP | 3250659 | 11/1991 |
| JP | 5027257 | 2/1993 |
| JP | 5085894 | 4/1993 |
| JP | 5313103 | 11/1993 |
| JP | 5333164 | 12/1993 |
| JP | 5335435 | 12/1993 |
| JP | 06242260 | 9/1994 |
| JP | 6314694 | 11/1994 |
| JP | 06337292 | 12/1994 |
| JP | 7129952 | 5/1995 |
| JP | 07145000 | 6/1995 |
| JP | 8040797 | 2/1996 |
| JP | 8148594 | 6/1996 |
| JP | 09008690 | 1/1997 |
| JP | 9213773 | 8/1997 |
| JP | 9270565 | 10/1997 |
| JP | 9295895 | 11/1997 |
| JP | 10239520 | 9/1998 |
| JP | 10269543 | 10/1998 |
| JP | 10275955 | 10/1998 |
| JP | 10335259 | 12/1998 |
| JP | 11135889 | 5/1999 |
| JP | 2000183203 | 6/2000 |
| JP | 2000196149 | 7/2000 |
| JP | 2001134927 | 5/2001 |
| JP | 2001176993 | 6/2001 |
| JP | 2001237335 | 8/2001 |
| JP | 2001298170 | 10/2001 |
| JP | 2002015977 | 1/2002 |
| JP | 2002109854 | 4/2002 |
| JP | 2002184845 | 6/2002 |
| JP | 2002201096 | 7/2002 |
| JP | 2002255694 | 9/2002 |
| JP | 2002289529 | 10/2002 |
| JP | 2002293692 | 10/2002 |
| JP | 2003015156 | 1/2003 |
| JP | 2003069176 | 3/2003 |

(56) References Cited

FOREIGN PATENT DOCUMENTS

| | | |
|---|---|---|
| JP | 2003133802 | 5/2003 |
| JP | 2003137690 | 5/2003 |
| JP | 2003245847 | 9/2003 |
| JP | 2003277194 | 10/2003 |
| JP | 2003282551 | 10/2003 |
| JP | 2003332234 | 11/2003 |
| JP | 2004111848 | 4/2004 |
| JP | 2004168622 | 6/2004 |
| JP | 2004288934 | 10/2004 |
| JP | 2004296575 | 10/2004 |
| JP | 2004296701 | 10/2004 |
| JP | 2004296912 | 10/2004 |
| JP | 2005047718 | 2/2005 |
| JP | 2005064492 | 3/2005 |
| JP | 2005079171 | 3/2005 |
| JP | 2005085888 | 3/2005 |
| JP | 2005101230 | 4/2005 |
| JP | 2005104742 | 4/2005 |
| JP | 2005136106 | 5/2005 |
| JP | 2005277334 | 10/2005 |
| JP | 2005285869 | 10/2005 |
| JP | 2005314121 | 11/2005 |
| JP | 2006016230 | 1/2006 |
| JP | 2006016239 | 1/2006 |
| JP | 2006062931 | 3/2006 |
| JP | 2006066442 | 3/2006 |
| JP | 2006232639 | 9/2006 |
| JP | 2006232640 | 9/2006 |
| JP | 2006339308 | 12/2006 |
| JP | 2007150072 | 6/2007 |
| JP | 2007237627 | 9/2007 |
| JP | 2007237628 | 9/2007 |
| JP | 2007269577 | 10/2007 |
| JP | 2008111984 | 5/2008 |
| JP | 2008211040 | 9/2008 |
| JP | 2008297150 | 12/2008 |
| JP | 2009263534 | 11/2009 |
| JP | 2010056485 | 3/2010 |
| KR | 20100090897 | 8/2010 |
| WO | WO98/56575 | 12/1998 |
| WO | WO02/054718 | 7/2002 |
| WO | WO2004/059731 | 7/2004 |
| WO | WO2007/143480 | 12/2007 |
| WO | WO2008/036888 | 3/2008 |
| WO | WO2008/122296 | 10/2008 |
| WO | WO2009/025842 | 2/2009 |
| WO | WO2009/151160 | 12/2009 |
| WO | WO2010/057842 | 2/2010 |

OTHER PUBLICATIONS

Quick, Darren, "Aston Martin teams with Mobiado for transparent touchscreen concept phone," Mar. 28, 2011, pp. 1-5, retrieved from the internet: URL:http://www-gizmag.com/cpt002-aston-martin-concept-phone/18248.

Zahler, James, "Sapphire and GaN Substrate Materials," DOE SSL Manufacturing R&D Workshop 2012, Presentation, Apr. 14, 2012, pp. 1-19.

Flores, Marc, "Can a Case Scratch the iPhone 4's Glass and Shatter it?," Oct. 8, 2010, pp. 1-10, retrieved from the internet: URL:http://www.intomobile.com/2010/10/08/glassgate-iphone-4.

Sykes, Neil, "The Use of Lasers in Target Manufacture," 2010, pp. 1-24, retrieved from the internet: URL:http://www.stfc.ac.uk/CLF/resources/PDF/events_3effw_weds_sykes.pdf.

International Search Report and Written Opinion, PCT Application No. PCT/US2013/0049444, 24 pages, Feb. 28, 2014.

International Search Report and Written Opinion, PCT Application No. PCT/US2014/0010145, 11 pages, Apr. 4, 2014.

\* cited by examiner

COVER GLASS ARRANGEMENT FOR AN ELECTRONIC DEVICE

TECHNICAL FIELD

The present invention relates generally to electronic devices, and more specifically, to cameras in electronic devices. Still more particularly, the present invention relates to a cover glass arrangement for a camera included in an electronic device.

BACKGROUND

Many electronic devices, such as smart telephones, laptop computers, and tablet computing devices include a camera to capture images and video. FIG. 1 is a cross-sectional view of a prior art electronic device. The electronic device 100 includes a camera 102 positioned adjacent to a surface 104 of the electronic device. The surface can be the front or the back surface of the electronic device 100. In some devices, a cover glass 106 is disposed over the surface 104 when the camera 102 is positioned adjacent to the front surface of the electronic device 100. The cover glass 106 can provide various functions or features for the electronic device. For example, in some embodiments, the cover glass 106 can be a touchscreen and provide an aperture for a speaker and microphone.

In some embodiments, the cover glass 106 can constrain the amount of space that is available to the camera 102. As a result, the functionality of the camera can be limited. For example, a flash module may not be included in the electronic device, or the camera may not include an autofocus feature or a high quality lens.

SUMMARY

In one aspect, an electronic device can include a camera and a first cover glass disposed over the camera. An opening can be formed through the first cover glass over a light-receiving region of the camera. A second cover glass can be positioned in the opening over the light-receiving region of the camera. A thickness of the second cover glass is less than a thickness of the first cover glass. In some embodiments, the second cover glass is a lens for the camera.

In another aspect, an electronic device can include a camera and a monolithic cover glass disposed over the camera. The cover glass includes a thinner region that is positioned over a light-receiving region of the camera. The thinner region can act as a lens for the camera.

In yet another aspect, a method for producing an electronic device can include providing a first cover glass having an opening formed through the first cover glass, and providing a second cover glass in the opening. A location of the opening corresponds to a light-receiving region of a camera. A thickness of the second cover glass is less than a thickness of the first cover glass.

In another aspect, a method for providing an electronic device can include providing a camera in the electronic device, and providing a monolithic cover glass over the camera. The cover glass includes a thinner region that is positioned over a light-receiving region of the camera.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide a cover glass arrangement for an electronic device that includes one or more cameras. The cover glass arrangement can include a first cover glass and a second cover glass, where the second cover glass is positioned in an opening formed through the first cover glass. In one embodiment, the second cover glass can be disposed over a light-receiving region of a camera. In another embodiment, the second cover glass is positioned over the light-receiving region and at least part of one or more non-light receiving regions of the camera.

The second cover glass can have a thickness that is less than the thickness of the first cover glass. The thinner second cover glass can provide additional space for the camera and/or for an optional lens. In some embodiments, a higher quality camera can be included in an electronic device when the additional space is provided by the thinner second cover glass. For example, a higher quality camera can include a larger sensor, higher quality lenses, an autofocus feature, and/or a flash module.

In another embodiment, the cover glass arrangement can include a monolithic cover glass that includes a thinner region formed in the cover glass. The thinner region can be disposed over the light-receiving region, or over the light-receiving region and at least part of one or more non-light receiving regions of the camera. Like the second cover glass, the thinner region can provide additional space for the camera and/or for an optional lens.

Figure 1:
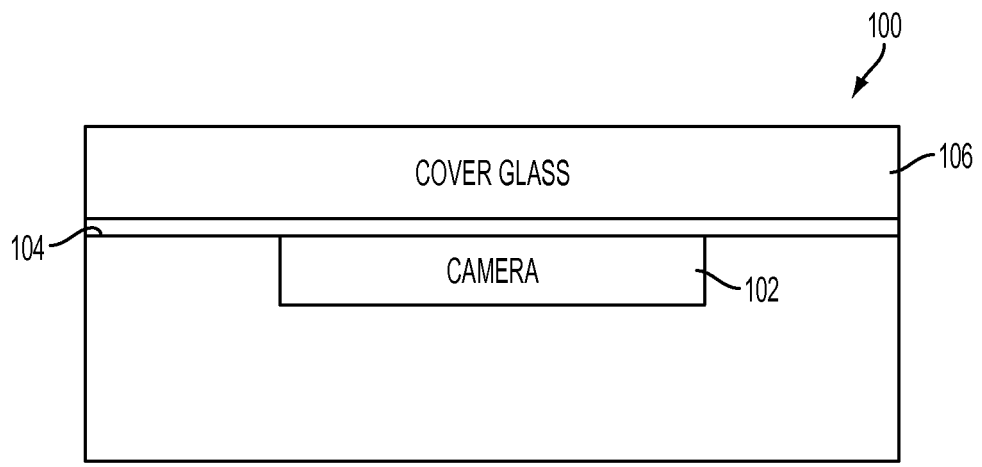
FIG. 1 is a cross-sectional view of a prior art electronic device.
Figure 2A:
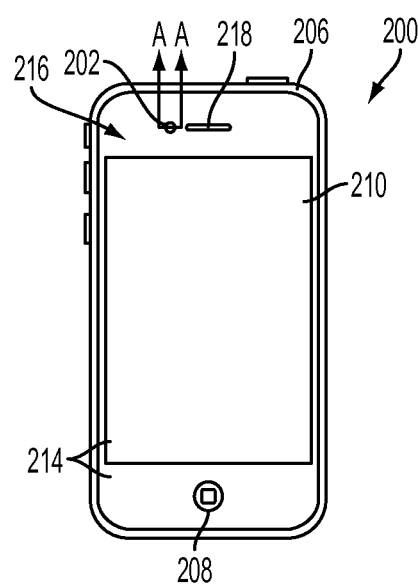
FIG. 2A illustrates a front perspective view of one example of an electronic device that includes one or more cameras.
Figure 2B:
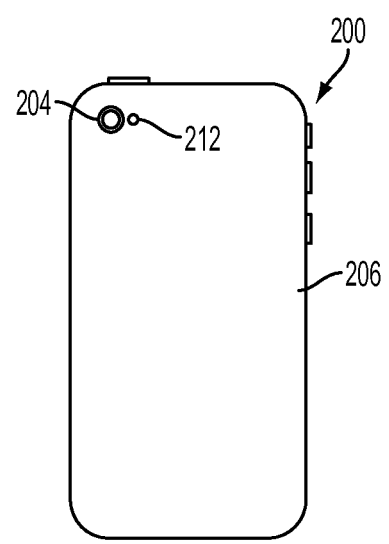
FIG. 2B depicts a rear perspective view of the electronic device 200 shown in FIG. 2A.

Referring now to FIGS. 2A-2B, there are shown front and rear perspective views of one example of an electronic device that can include one or more cameras. The electronic device 200 includes a first camera 202, a second camera 204, an enclosure 206, a display 210, an input/output (I/O) member 208, and an optional flash 212 or light source for the camera or cameras. The electronic device 200 can also include one or more internal components (not shown) typical of a computing or electronic device, such as, for example, one or more processors, memory components, network interfaces, and so on.

In the illustrated embodiment, a cover glass 214 is disposed over the front surface 216 of the electronic device 200. The cover glass 214 can be made of any suitable material, including, but not limited to, glass, plastic, acrylic, sapphire, and various combinations thereof. One or more portions of the cover glass 214 can be an input region for a touch sensing device and/or a force sensing device. The cover glass 214 can include one or more apertures, such as an aperture for a speaker and/or a microphone 218 and the I/O member 208. In the illustrated embodiment, the cover glass 214 is positioned over the entire front surface 216 of the electronic device. Thus, the cover glass 214 is disposed over the display, the first camera 202, and the enclosure 206. In other embodiments, the cover glass 214 can be disposed over one or more portions of a surface or surfaces of the electronic device.

As shown in FIGS. 2A-2B, the electronic device 200 is implemented as a smart telephone. Other embodiments, however, are not limited to this type of electronic device. Other types of computing or electronic devices can include one or more cameras, examples of which include a netbook or laptop computer, a tablet computing device, a wearable computing or display device such as a watch or glasses, a digital camera, a printer, a scanner, a video recorder, and a copier.

The enclosure 206 can form an outer surface or partial outer surface and protective case for the internal components of the electronic device 200, and may at least partially surround the display 210. The enclosure 206 can be formed of one or more components operably connected together, such as a front piece and a back piece. Alternatively, the enclosure 206 can be formed of a single piece operably connected to the display 210.

The I/O member 208 can be implemented with any type of input or output member. By way of example only, the I/O member 208 can be a switch, a button, a capacitive sensor, or other input mechanism. The I/O member 208 allows a user to interact with the electronic device 200. For example, the I/O member 208 may be a button or switch to alter the volume, return to a home screen, and the like. The electronic device can include one or more input members or output members, and each member can have a single I/O function or multiple I/O functions.

The display 210 can be operably or communicatively connected to the electronic device 200. The display 210 can be implemented with any type of suitable display, such as a retina display or an active matrix color liquid crystal display. The display 210 can provide a visual output for the electronic device 200 or function to receive user inputs to the electronic device. For example, the display 210 can be a multi-touch capacitive sensing touchscreen that can detect one or more user touch and/or force inputs.

Figure 3:
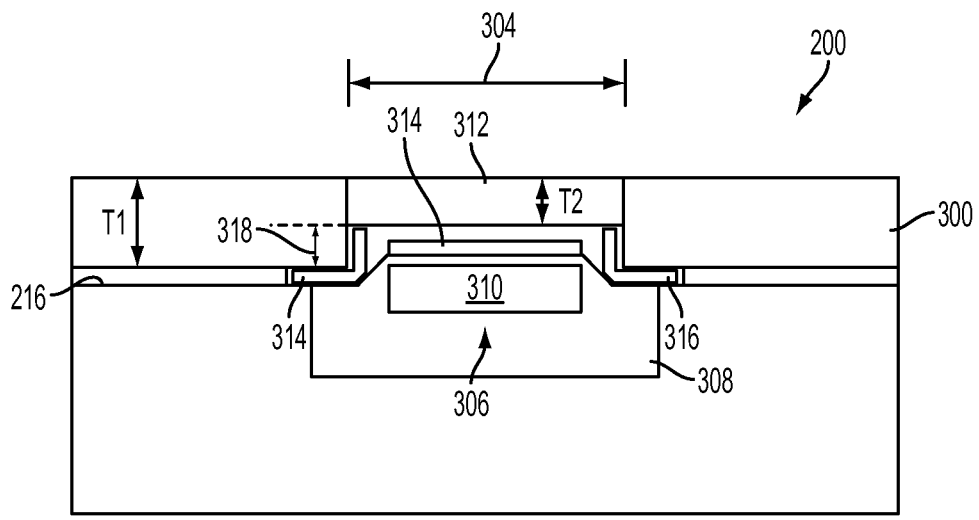
FIGS. 3-5 are simplified cross-section views of examples of the electronic device 200 taken along line A-A in FIG. 2A.
Figure 4:
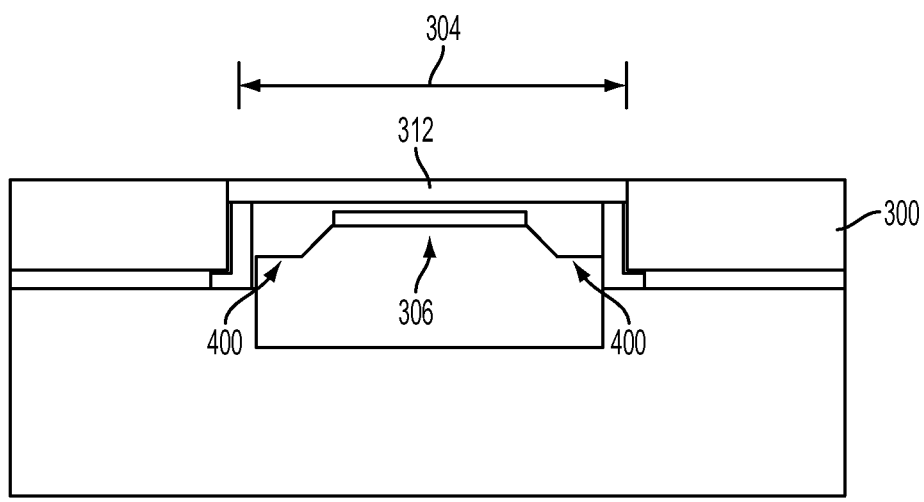
Figure 5:
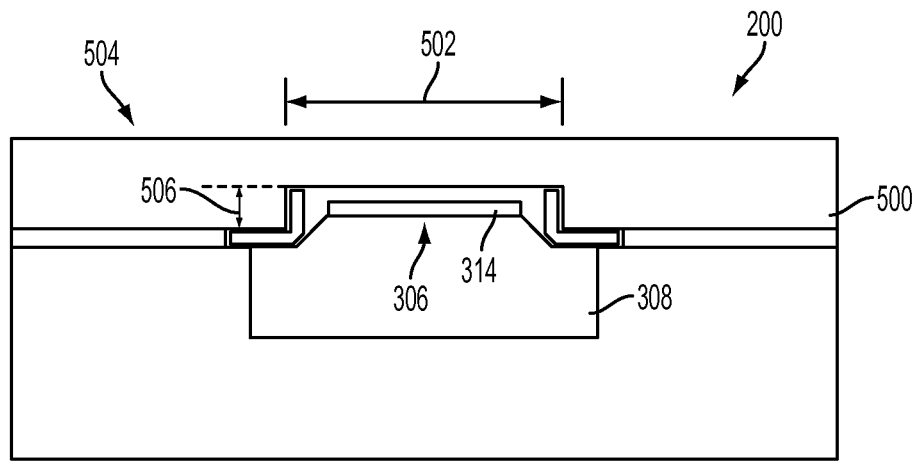

FIGS. 3-5 are simplified cross-sectional views of examples of the electronic device 200 taken along line A-A in FIG. 2A. As shown in FIG. 3, a first cover glass 300 is disposed over the surface 216 of the electronic device 200. The first cover glass 300 has a thickness T1. An opening 304 can be formed through the first cover glass 300 around the light-receiving region 306 of a camera 308. In some embodiments, the light-receiving region of the camera is associated with one or more image sensors 310 included in the camera.

A second cover glass 312 can be disposed in the opening 304. The second cover glass 312 has a thickness T2, and T2 is less than T1. The thinner second cover glass 312 can be made of any suitable material, including, but not limited to, sapphire, glass, acrylic, plastic, and various combination thereof. In some embodiments, the second cover glass 312 is a first lens in optical communication with the camera 308. Additionally or alternatively, a second lens 314 can be positioned between the second cover glass 312 and the camera 308. The second lens 314 can be formed with one or more lenses that each have any given shape and dimensions. Example shapes include, but are not limited to, circular, lozenge, or triangular.

The second cover glass 312 can attach to one or more brackets 316. The bracket or brackets 316 can have any given configuration and size, and can be positioned at any location. Additionally or alternatively, the second cover glass 312 can be attached to a frame (not shown) that attaches to the first cover glass 300. Any suitable attachment mechanism can be used to attach the second cover glass 312 to the bracket(s) 316 and/or to the frame. By way of example only, an adhesive material and/or a fastener can be used to attach the second cover glass 312 to the bracket(s) 316 and/or to the frame.

The opening 304 and the thinner second cover glass 312 provides additional space 318 for the camera 308 and/or the optional second lens 314. In some embodiments, a higher quality camera can be included in the electronic device 200 when the additional space 318 is present. For example, a higher quality camera can include a larger sensor, higher quality lenses, an autofocus feature, and/or a flash module. In some embodiments, a front-facing camera (e.g., camera 202) can be of equal or near-equal quality as a rear-facing camera (e.g., camera 204).

The embodiment shown in FIG. 4 is similar to the embodiment shown in FIG. 3 except that the opening 304 in the first cover glass 300 is larger. The second cover glass 312 is disposed over the light-receiving region 306 and at least part of one or more non-light receiving regions 400 of the camera.

The cross-sectional view in FIG. 5 includes a monolithic cover glass 500. The cover glass 500 has a region 502 that is thinner than other areas 504 of the cover glass 500. Region 502 can have any given shape and dimensions. The thinner region 502 can be disposed over the light-receiving region 306 of the camera 308. Additionally, the thinner region 502 can have a size and/or shape that positions the thinner region over some or all of the non-light receiving regions of the camera 308. Like the first and second cover glasses 300 and 312, the cover glass 500 can be made of any suitable material such as sapphire, glass, plastic, and various combinations of materials.

In some embodiments, the thinner region 502 can be shaped such that the thinner region acts as a lens. The lens can be in optical communication with the light-receiving region 306 of the camera 308. Additionally or alternatively, the second lens 314 can be positioned between the cover glass 500 and the camera 308. The thinner region 502 provides additional space 506 for the camera 308 and/or the optional second lens 314.

Figure 6:
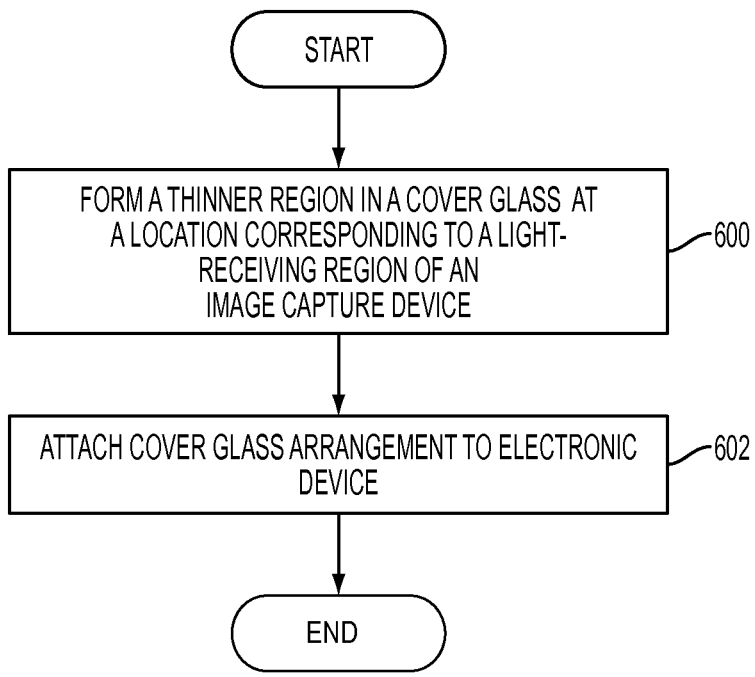
FIG. 6 is a flowchart of a method for producing the cover glass arrangement shown in FIG. 5.

FIG. 6 is a flowchart of a method for producing the cover glass arrangement shown in FIG. 5. Initially, a thinner region can be formed in a monolithic cover glass, as shown in block 600. The thinner region can be formed with any known cutting, shaping, or trimming process. The location of the thinner region can correspond to a light-receiving region of a camera, or to the light-receiving region and at least a part of one or more non-light receiving regions of the camera.

Next, as shown in block 602, the cover glass arrangement can be attached to the electronic device. As described earlier, any suitable attachment mechanism can be used to connect the cover glass arrangement to the electronic device. For example, an adhesive material and/or a fastener can attach the cover glass arrangement to the electronic device.

Figure 7:
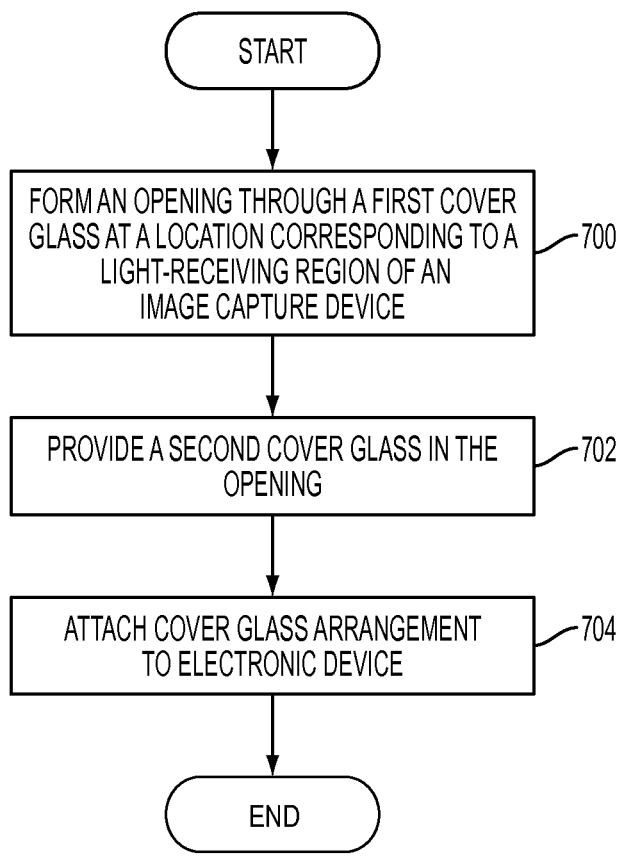
FIG. 7 is a flowchart of a method for producing the cover glass arrangement shown in FIGS. 3-4.

FIG. 7 is a flowchart of a method for producing the cover glass arrangement shown in FIGS. 3-4. Initially, an opening can be formed through a first cover glass (block 700). The opening can be formed using any suitable process. For example, the opening can be formed through the first cover glass by etching or grinding the first cover glass. The location of the opening can correspond to the light-receiving region of a camera, or to the light-receiving region and at least a part of one or more non-light receiving regions of the camera.

A second cover glass can then be positioned in the opening, as shown in block 702. The thickness of the second cover glass is less than the thickness of the first cover glass. The cover glass arrangement can then be attached to the electronic device. In one embodiment, the first cover glass is affixed to a frame in the electronic device. The second cover glass can be attached to the first cover glass, to one or more brackets, and/or to the frame attached to the first cover glass.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible. For example, although the embodiments shown in FIGS. 3-5 depict the front-facing first camera 202 (FIG. 2), those skilled in the art will recognize that the invention can be used with the rear-facing second camera 404. Additionally, a cover glass arrangement can include multiple openings with a second cover glass positioned in each opening, or multiple thinner regions formed in a cover glass. Additionally or alternatively, a cover glass arrangement can include both one or more openings with a second cover glass positioned in each opening and one or more thinner regions.

What is claimed is:

1. An electronic device, comprising:
   a camera;
   a first cover glass disposed over the camera;
   an opening formed through the first cover glass over a light-receiving region of the camera; and
   a second cover glass positioned in the opening over the light-receiving region of the camera, wherein a thickness of the second cover glass is less than a thickness of the first cover glass.

2. The electronic device as in claim 1, wherein the second cover glass comprises sapphire.

3. The electronic device as in claim 1, wherein the second cover glass comprises a lens in optical communication with the light-receiving region of the camera.

4. The electronic device as in claim 1, wherein the electronic device comprises a smart telephone.

5. An electronic device, comprising:
   a camera; and
   a monolithic cover glass disposed over the camera, wherein:
      the cover glass includes a first region that forms an outer surface of the electronic device, and a second region over a light-receiving region of the camera; and
      the second region is thinner than the first region.

6. The electronic device as in claim 5, wherein the cover glass comprises sapphire.

7. The electronic device as in claim 5, wherein the second region comprises a lens in optical communication with the light-receiving region of the camera.

8. The electronic device as in claim 5, wherein the electronic device comprises a smart telephone.

9. A method for producing an electronic device, comprising:
   providing a first cover glass having an opening formed through the first cover glass, wherein a location of the opening corresponds to a light-receiving region of a camera; and
   disposing a second cover glass in the opening, wherein a thickness of the second cover glass is less than a thickness of the first cover glass.

10. The method as in claim 9, further comprising disposing a camera in the electronic device.

11. The method as in claim 9, further comprising attaching the first and second cover glasses to the electronic device.

12. The method as in claim 9, wherein disposing the second cover glass in the opening comprises disposing a sapphire cover glass in the opening.

13. The method as in claim 9, wherein disposing the second cover glass in the opening comprises disposing a lens in the opening such that the lens can be in optical communication with the light-receiving region of the camera.

14. A method for producing an electronic device, the method comprising:
   disposing a camera in the electronic device; and
   disposing a monolithic cover glass over the camera, wherein:
      the cover glass includes a first region that forms an outer surface of the electronic device, and a second region over a light-receiving region of the camera; and
      the second region is thinner than the first region.

15. The method as in claim 14, wherein disposing the monolithic cover glass over the camera comprises disposing a monolithic cover glass over a surface of the electronic device.

16. The method as in claim 14, wherein disposing the monolithic cover glass over the camera comprises disposing a monolithic sapphire cover glass over the camera.

17. The method as in claim 14, wherein the second region over the light-receiving region of the camera comprises a lens in optical communication with the light-receiving region of the camera.

* * * * *